United States Patent
Weinberg et al.

(10) Patent No.: US 7,734,625 B2
(45) Date of Patent: *Jun. 8, 2010

(54) METHOD FOR PERFORMING EXPRESSION-BASED VALIDATION

(75) Inventors: Paul N. Weinberg, Los Angeles, CA (US); Richard T. Endo, Los Angeles, CA (US); Wenphing Lo, Alhambra, CA (US)

(73) Assignee: SAP, AG, Walldorf (DE)

( * ) Notice: Subject to any disclaimer, the term of this patent is extended or adjusted under 35 U.S.C. 154(b) by 174 days.

This patent is subject to a terminal disclaimer.

(21) Appl. No.: 11/193,013

(22) Filed: Jul. 29, 2005

(65) Prior Publication Data

US 2007/0027847 A1 Feb. 1, 2007

(51) Int. Cl.
*G06F 17/30* (2006.01)

(52) U.S. Cl. .................. 707/736; 707/754; 707/805

(58) Field of Classification Search ............... None
See application file for complete search history.

(56) References Cited

U.S. PATENT DOCUMENTS

| | | | |
|---|---|---|---|
| 6,535,883 B1 * | 3/2003 | Lee et al. ............ | 707/100 |
| 6,658,622 B1 * | 12/2003 | Aiken et al. ......... | 715/507 |
| 6,964,010 B1 * | 11/2005 | Sharp ................. | 715/507 |
| 2003/0115186 A1 * | 6/2003 | Wilkinson et al. ... | 707/3 |
| 2003/0154191 A1 * | 8/2003 | Fish et al. ........... | 707/2 |
| 2004/0073868 A1 * | 4/2004 | Easter et al. ........ | 715/507 |
| 2005/0289517 A1 * | 12/2005 | Balfe et al. ......... | 717/126 |
| 2006/0053106 A1 * | 3/2006 | Bhaghavan et al. .. | 707/4 |
| 2006/0074731 A1 * | 4/2006 | Green et al. ......... | 705/8 |
| 2006/0122956 A1 * | 6/2006 | Shimogori ........... | 707/1 |
| 2006/0253466 A1 * | 11/2006 | Upton ................. | 707/100 |
| 2006/0253831 A1 * | 11/2006 | Harper et al. ........ | 717/106 |

* cited by examiner

*Primary Examiner*—Don Wong
*Assistant Examiner*—Belinda Xue
(74) *Attorney, Agent, or Firm*—Dalina Law Group, P.C.

(57) ABSTRACT

A method for performing expression-based validation with records in a computer system database, eliminating the need to write programs or scripts. A validation expression can define complex intra-record tests and inter-record tests and may be performed manually against one or more records and have a success or failure indicated for each record in an interface. A validation expression may be placed into one or more groups and performed as a group with the success or failure indicated for each record. A validation expression may be initiated from workflows to implement a business process with system-enforced data integrity. A validation expression may be manually executed or automatically executed when attempting record update to prevent the entry of invalid data and ensure data integrity. A validation expression may also be used to search using the Boolean result of validation expressions.

20 Claims, 11 Drawing Sheets

| | Check Pri | Check SKU | SKU | Description |
|---|---|---|---|---|
| | ✓ | ✓ | CA (200) 135-12 | Superia Print Film |
| | ✗ | ✓ | CA (200) 135-24 | Superia Print Film |
| | ✓ | ✓ | CA (200) 135-36 | Superia Print Film |
| | ✓ | ✓ | CH (400) 135-12 | Superia Print Film |
| | ✓ | ✓ | CH (400) 135-24 | Superia Print Film |
| | ✓ | ✗ | CH (400) 135-36 | Superia Print Film |
| | ✓ | ✓ | CN (100) 135-12 | Superia Print Film |
| | ✓ | ✓ | CN (100) 135-24 | Superia Print Film |
| | | | CZ (800) 135-36 | Superia Print Film |
| | ✓ | ✓ | EB (100) 135-24 | Ektachrome Elite Slide Film |
| | ✓ | ✓ | EB (100) 135-36 | Ektachrome Elite Slide Film |

601 — Check Pri
602 — Check SKU

| Record Detail | Language Detail | Family Detail | Validations | Workflow | Search Selections |
| --- | --- | --- | --- | --- | --- |
| | English [US] | | English [UK] | | Japanese [JA] |
| Description | Kodachrome Professional Slide Film | Kodachrome Professional Slide Film | Kodachromeの専門のスライドのフィルム |
| Category | Professional Slide Film | Professional Slide Film | 専門のスライドのフィルム |
| Manufacturer | Kodak | Kodak | Kodak |
| Long Description | Long the leader in variety and Excellent natural color quality with | Long the leader in variety and Excellent natural color quality with | 変化及び技術、コダックの長くリーダー体 Excellent natural color quality with superior |
| Pictures | 64 | 64 | 64 |
| Spec Sheets | | | |

800

801 — Description
802 — Category
803 — Manufacturer
804 — Long Description
805 — Pictures

METHOD FOR PERFORMING EXPRESSION-BASED VALIDATION

BACKGROUND OF THE INVENTION

1. Field of the Invention

Embodiments of the invention described herein pertain to the field of computer systems. More particularly, but not by way of limitation, one or more embodiments of the invention enable methods for performing expression-based validations on specified records in a computer system database without writing programs, scripts or queries.

2. Description of the Related Art

Known methods for creating and performing expressions in a computer system require complex and error prone expression entry. Wizards exist that help a user construct an expression, however the user must still have extensive programming knowledge in order to effectively create a expression. The user must for example still understand the rules and syntax for creating a properly formed expression. Wizards help to create properly formed expressions, however known wizards are primarily concerned with aiding a user in the formatting nuances associated with complex expressions. Wizards do not allow for validation rules to be defined as expressions, and do not allow for the expressions to be performed manually over selected records and do not show the success or failure of the validation in association with the records themselves. In addition, known expression creation tools do not allow for validations to be grouped, do not allow for validations to be called from workflows, do not allow for the expressions to be automatically performed upon database updates and do not allow for searches to be conducted to find records that match the expression.

For at least the limitations described above there is a need for a method for performing expression-based validation.

BRIEF SUMMARY OF THE INVENTION

One or more embodiments of the invention enable methods for performing validations. Validations comprise metadata and validation rules. Validations rules are defined and performed on desired records in a computer system database without requiring programs, scripts or queries to be written. The validation rules are created using tokenized expressions and are also known as validation expressions. After a validation expression is created it may then be performed with respect to one or more records. A validation expression returns a Boolean result that signifies a success or failure result.

As utilized in the context of this disclosure, "attributes" are quantities that are associated with subsets of the main data table, i.e., specific to a given category. "Fields" are associated with all records of the main data table, i.e., all records in the main data table comprise the same fields. However, based on the value of a category field or other any other fields of the main data table, attributes may be associated with a subset of the records of the main data table. An "audience" may be thought of as a third dimension added on top of the main data table and attribute tables so that audiences that comprise different languages, regions, regulatory zones, or any other subdivision based on any quantity may be used to form a hierarchy upon which to find data for fields or attributes that are not found on a given audience level in the database. Audiences can be as complex as required to support the number of targets and number of languages, regions, religions, cultures or any other division conceivable. An audience hierarchy may be formed from the viewpoint of a given audience to take advantage of the entries of most of the other fields of another audience, so that multiple audiences that are similar may be readily supported. For example, to support a catalog targeting the United Kingdom, the word "colour" in a field or attribute would simply need to have the word "color" replaced in order to support the same catalog targeted at the United States. By making one audience inherit from another, any entries not found in one audience are automatically obtained from another audience. This increases the integrity of the data and allows for one edit to alter the output for as many audiences as use a piece of data. "Lookup tables" are used in order to place a text object for example in one place in the database and which are referenced by a smaller quantity, i.e., a reference identifier or key into the lookup table.

A validation expression can define intra-record tests and inter-record tests with unlimited complexity. Specifically, validation expressions can reference fields and attributes (using any table including the main table, lookup tables and non-lookup sub-tables), perform arithmetic, string, and logical operations, call built-in functions, and even reference other previously defined validations. A validation expression is token-based, so that a user is not required to manually type field, attribute, operator or function names. Instead, the tokens to be used in the expression are selected from drop-down lists, reducing the potential for typing error. For example, pre-defined dimensions and units of measure allow for tokenized input of these elements without requiring manual typing of the desired dimension or unit of measure. A validation expression may branch on audience, family or category values within a validation. The specific branch is then performed based on the value of the audience, family or category specific value for one or more designated records.

Validation expressions can be used to perform a variety of tests that implement sophisticated business logic that goes far beyond simple data integrity checks, including:

Ensuring that specific fields have non-Null values when other fields have a particular value.

Ensuring that non-lookup fields (fields without pick lists) have a legal value (e.g. Price>0).

Comparing the values of different fields to ensure that the relative values are legal (e.g. Price>Cost).

Ensuring that a workflow task is not allowed to proceed until workflow related validations return successful status.

A validation expression may be performed manually or automatically. When a validation expression is performed with respect to one or more records, the success or failure is indicated for each record in an interface. A validation expression may be performed automatically for a database update to warn against or prevent the entry of invalid data and ensure data integrity. A validation expression may also be automatically performed from one or more workflows to implement a business process with system-enforced data integrity. The validation metadata may comprise a setting that signifies the level of execution as warning and error. Executing the validation refers to executing the validation expression. Any method of executing the validation or validation expression is in keeping with the spirit of the invention.

Validation execution results in different behaviors based on the level of execution of the validation. For example, in one level a validation execution can be designated as a warning validation. In this mode a warning is displayed to a user before saving a record if a validation fails, although the record update still occurs. In another level of execution, a validation execution may be designated as an error validation for example. In this mode, the user interface displays the error and also prevents the record from being saved if a validation fails, i.e., if the Boolean value returned from the validation is FALSE. For validation groups, the final outcome of multiple validations are the results of each and every validation, so if any of the validations in a group fails, and the level of execution for the failed validation is warning level, then the warning is displayed and if the level of execution for another failed validation is error level, then the error is displayed and the update does not occur with respect to the data record that the validation refers to. Other embodiments of the invention may perform short circuit checking and display only the first error encountered in case of a large amount of validation errors related to one element. This saves the user from interacting with a multiplicity of error dialogs for example. Other embodiments of the invention may utilize a global level of execution for a validation group so that if any validation in the group fails, the whole group fails which prevents any of the updates associated with the group from occurring. Any other method of combining the results of the validations in a validation group are in keeping with the spirit of the invention.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

A method for performing expression-based validation will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Validations are made up of metadata and validation rules. Validations rules are defined and performed on desired records in a computer system database without requiring programs, scripts or queries to be written. The validation rules are created using tokenized expressions and are also known as validation expressions. After a validation expression is created it may then be performed with respect to one or more records. A validation expression returns a Boolean result that signifies a success or failure result.

A validation expression can define intra-record tests and inter-record tests with unlimited complexity. Specifically, validation expressions can reference fields and attributes (using any table including the main table, lookup tables and non-lookup sub-tables), perform arithmetic, string, and logical operations, call built-in functions, and even reference other previously defined validations. A validation expression is token-based, so that a user is not required to manually type field, attribute, operator or function names. Instead, the tokens to be used in the expression are selected from drop-down lists, reducing the potential for typing error. For example, pre-defined dimensions and units of measure allow for tokenized input of these elements without requiring manual typing of the desired dimension or unit of measure. A validation expression may branch on audience, family or category values within a validation. The specific branch is then performed based on the value of the audience, family or category specific value for one or more designated records.

Figure 1:
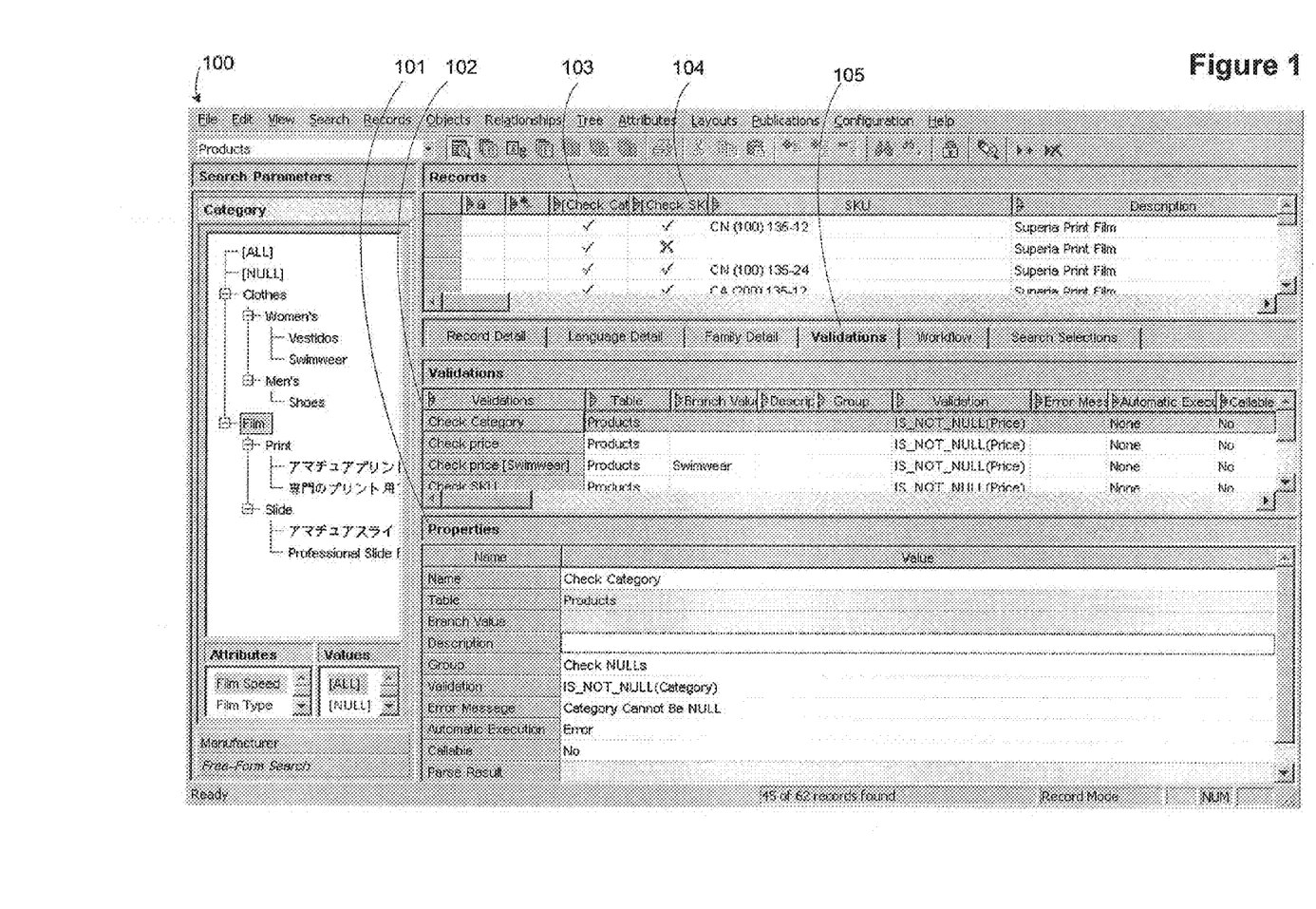
FIG. 1 illustrates an embodiment of an application comprising a validation metadata user interface.

FIG. 1 illustrates an embodiment of an application comprising a validation metadata user interface. The elements in application 100 comprise a validation tab 105 comprising rows of validations 102, each of which extends horizontally showing the name of the validation (e.g., "Check Category", "Check Price", "Check Price[Swimwear]", "Check SKU"), the table(s) associated with the validation, the branch value(s) used for branching the validation, a description of the validation, the group(s) that the validation is associated with, the validation expression, an error message to display when the validation fails, an automatic execution value of none, warning or error, a callable flag for determining if the validation is callable from another validation and a parse result read-only success or failure field that shows the results of parsing the validation expression. The properties of a selected validation, in this case the "Check Category" row in rows of validations 102 are shown in validation properties edit area 101. Each row in validation properties edit area 101 corresponds to each column in rows of validations 102. Each row in validation properties edit area 101 is edited by clicking the mouse in the corresponding row and entering information. The result of executing a validation or validation group is shown as a column in the records list, for example "[Check Category]" 103 and "[Check SKU]" 104 showing the status of each validation for example as will be described further below.

A validation expression may be performed manually or automatically. In either case, when a validation expression is performed with respect to one or more records, the success or failure is indicated for each record in an interface. A validation expression may be performed manually or automatically for a database update to warn against or prevent the entry of invalid data and ensure data integrity. A validation expression may also be automatically performed from one or more workflows to implement a business process with system-enforced data integrity. The validation metadata may comprise a setting that signifies the level of execution as being warning and error. Executing the validation refers to executing the validation expression. Any method of executing the validation or validation expression is in keeping with the spirit of the invention.

A validation expression may be placed into one or more groups and performed as a group with the success or failure indicated for each record for example visually. Each validation group is a set of validations that can be performed as a group as a single operation rather than requiring each individual validation to be separately performed. Validation groups allow for the organized use of large sets of related validations, eliminating the likelihood of forgetting to perform any of the individual validations in the group. For example, Trading Partner X may have a total of 125 validations while Trading Partner Y has a total of 143 validations, many of them in common with Trading Partner X. When a validation group is performed against a set of records, it is as if each individual validation in the group has been performed, and an individual success or failure result for each validation for each record is generated.

Figure 2:
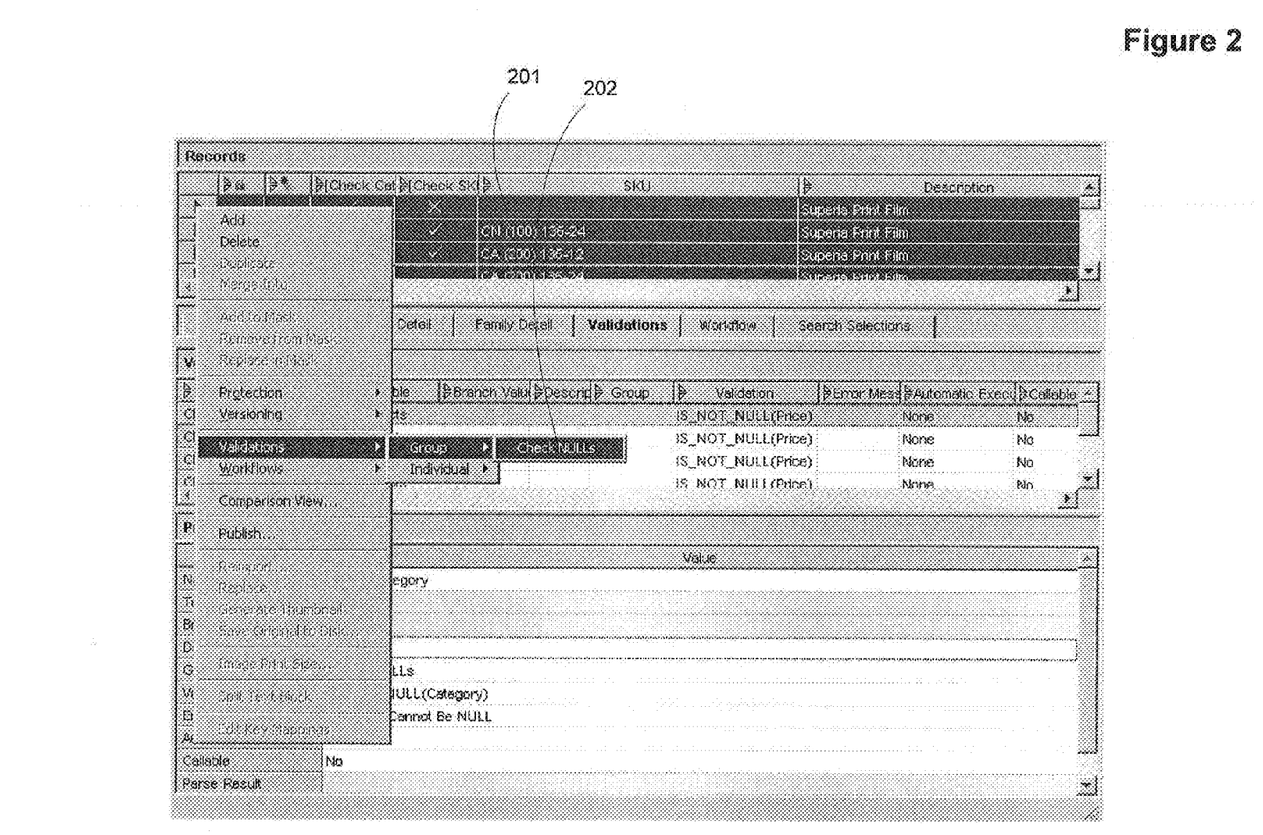
FIG. 2 illustrates an embodiment of a menu used for manual execution of a validation group.

An individual validation or validation group is performed manually by selecting one or more records to validate, right-clicking on one of the records and choosing validations from the context menu. Alternatively, choosing Records>Validations from the main menu also performs an individual validation or validation group. One embodiment of the execution menu comprises an execute menu item and an execute group menu item. Upon choosing execute or execute group, a second level of menu items appears comprising the names of the validations to perform. The specified validation or validation group is then performed and a message dialog is displayed indicating success or failure. FIG. 2 illustrates an embodiment of a menu used for manual execution of a validation group. Selected records 201, i.e., each row that is manually selected may have validation performed by right clicking the mouse for example and selecting the validation or validation group to execute. In this example, the validation group 202 named "Check NULLs" is executed which comprises the "Check Category" and "Check SKU" validations. The validations that are executed are shown as columns in the records area as previously described.

Figure 3:
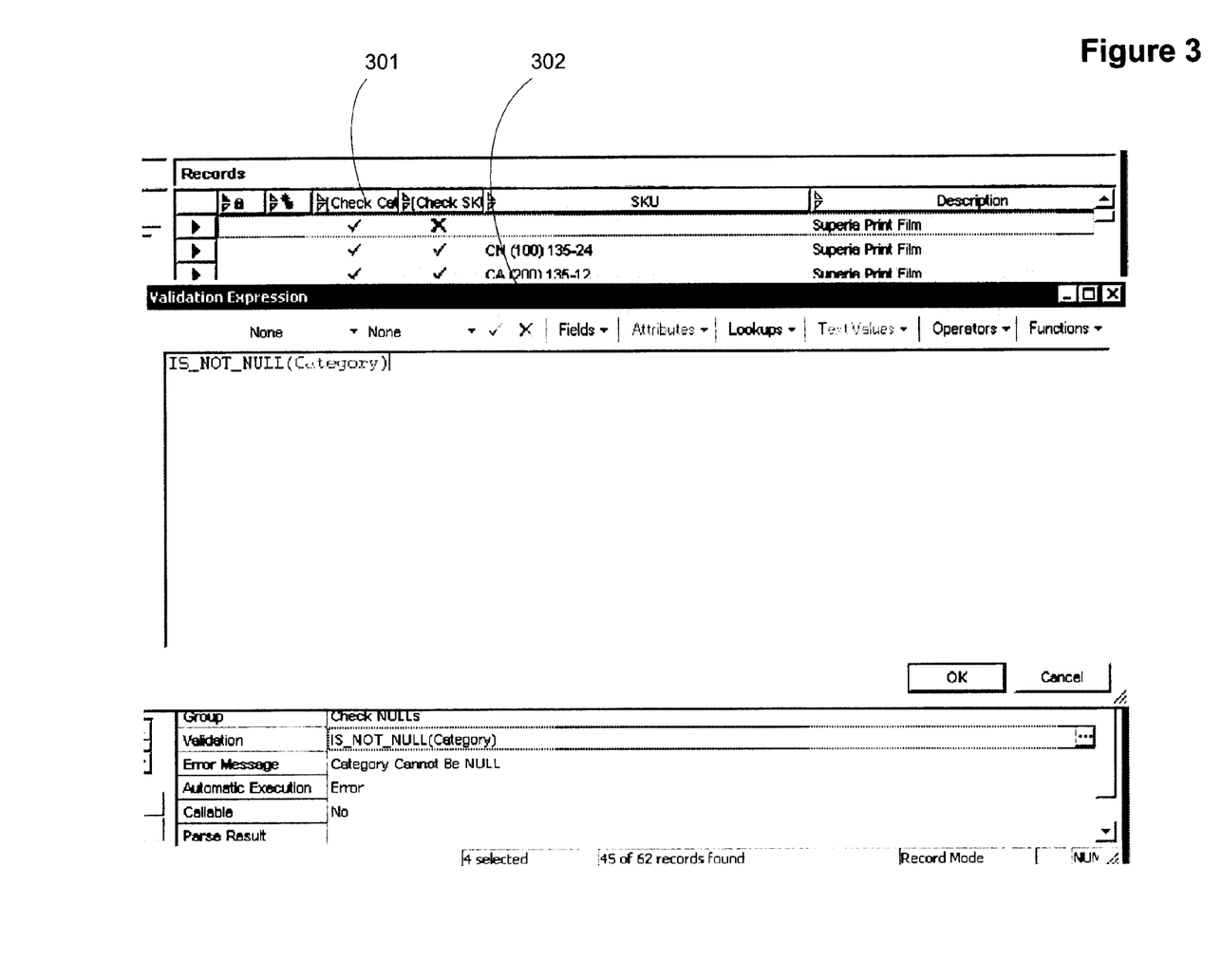
FIG. 3 illustrates an embodiment of the validation expression user interface.

FIG. 3 illustrates an embodiment of the validation expression user interface. The elements along the interface include a measure value input, dimension input, unit of measure input, field input, attribute input, lookup input, text value input, operator input and function input. Through use of tokenized values for dimensions, units of measure, fields, attributes, lookups, text values, operators and functions, a large body of errors associated with manual expression entry is eliminated from the validation expression generation process.

Validation groups may be organized into a hierarchy. A validation group hierarchy is similar to a data group hierarchy in that it does not show up in the drop-down list of tables and cannot be edited directly. Instead, the validation group hierarchy may be edited in one or more embodiments of the invention using a tree view user interface element or any other type of interface element capable of displaying a hierarchy. For example, the hierarchy may then be modified using a context menu editable tree to add siblings and children, and to delete and rename existing nodes.

Validation execution may result in different behaviors based on the level of execution of the validation. For example, in one level an automatic execution can be designated as a warning validation. In this mode a warning is displayed to a user before saving a record if an automatic validation fails. In another level of execution, an automatic execution may be designated as an error validation for example. In this mode, the user interface displays the error and also prevents the record from being saved if an automatic validation fails. For validation groups, the final outcome of multiple validations are the results of each and every validation, so if any of the validations in a group fails, and the level of execution for the failed validation is warning level, then the warning is displayed and if the level of execution for another failed validation is error level, then the error is displayed and the update does not occur with respect to the data record that the validation refers to. Other embodiments of the invention may perform short circuit checking and display only the first error encountered in case of a large amount of validation errors related to one element. This saves the user from interacting with a multiplicity of error dialogs for example. Other embodiments of the invention may utilize a global level of execution for a validation group so that if any validation in the group fails, the whole group fails which prevents any of the updates associated with the group from occurring. Any other method of combining the outcomes of the validations within a group are in keeping with the spirit of the invention.

Figure 4:
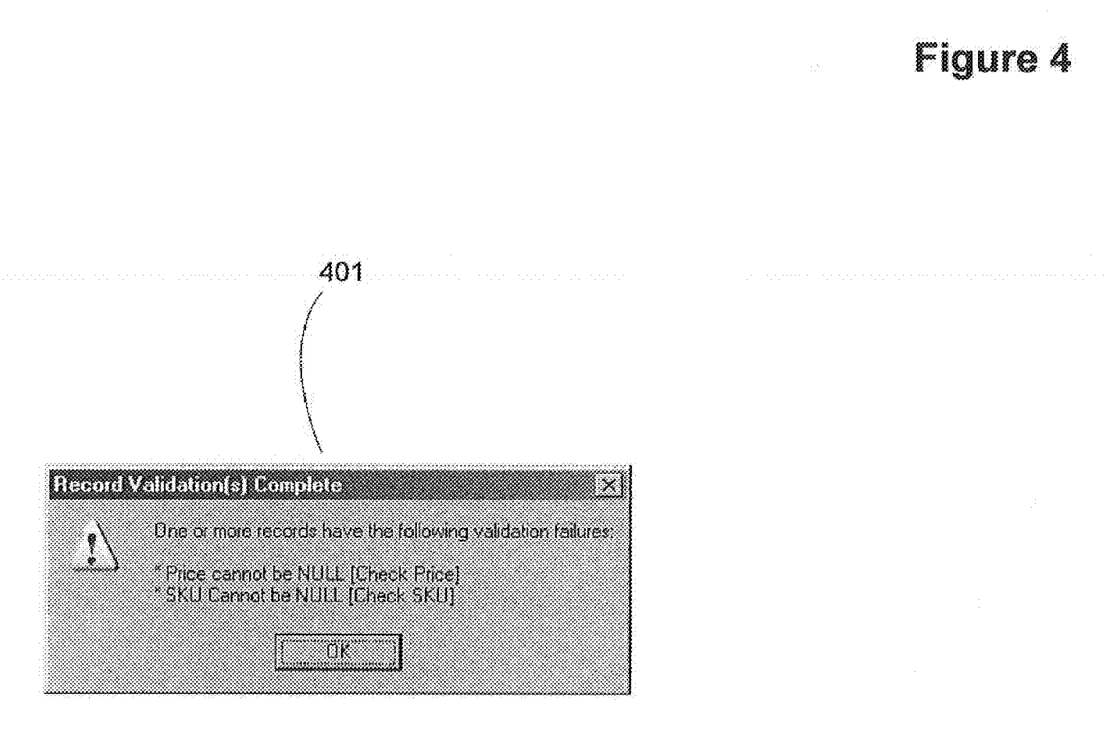
FIG. 4 illustrates an embodiment of the validation warning user interface.
Figure 5:
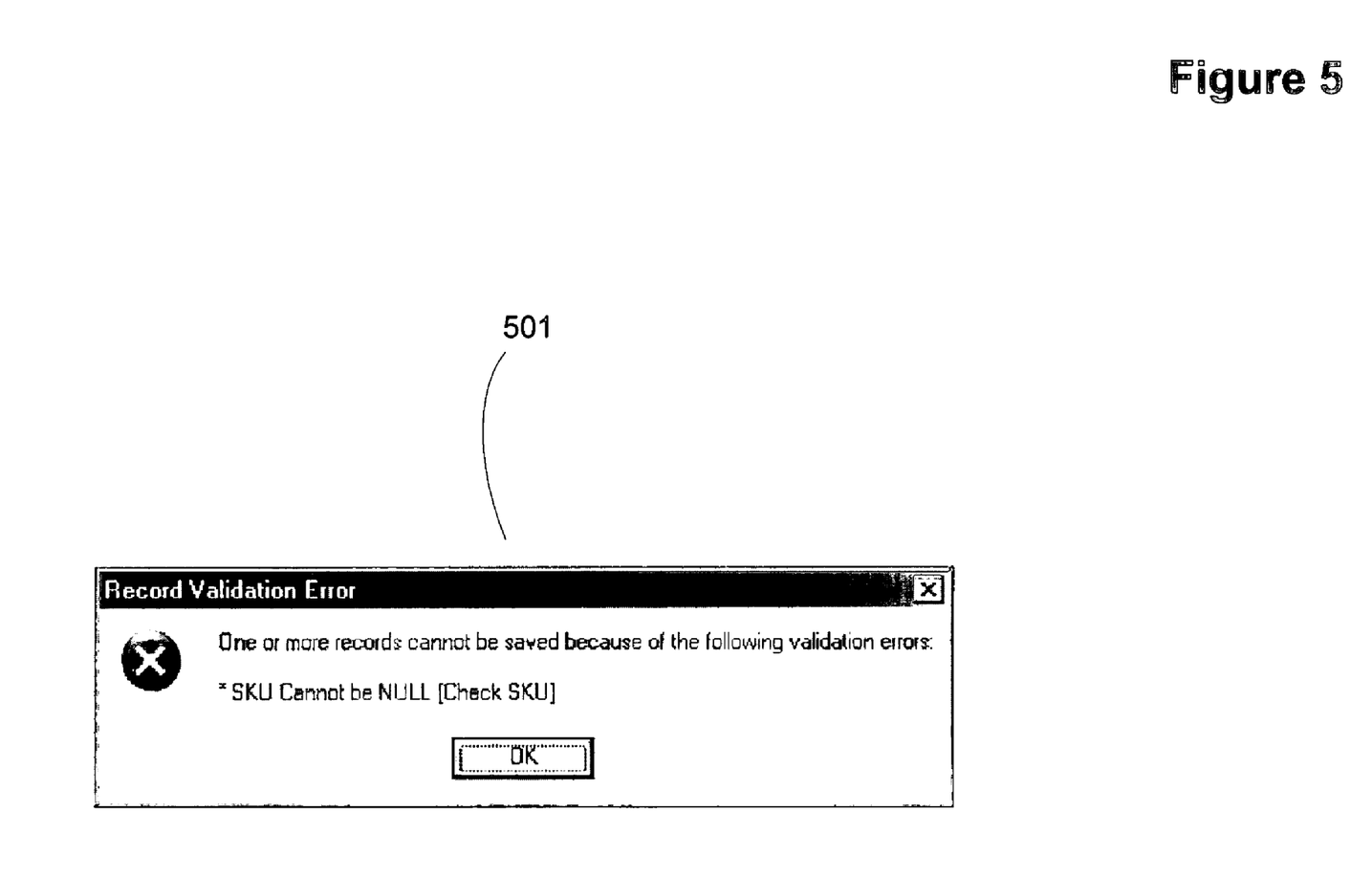
FIG. 5 illustrates an embodiment of the validation error user interface.
Figure 6:
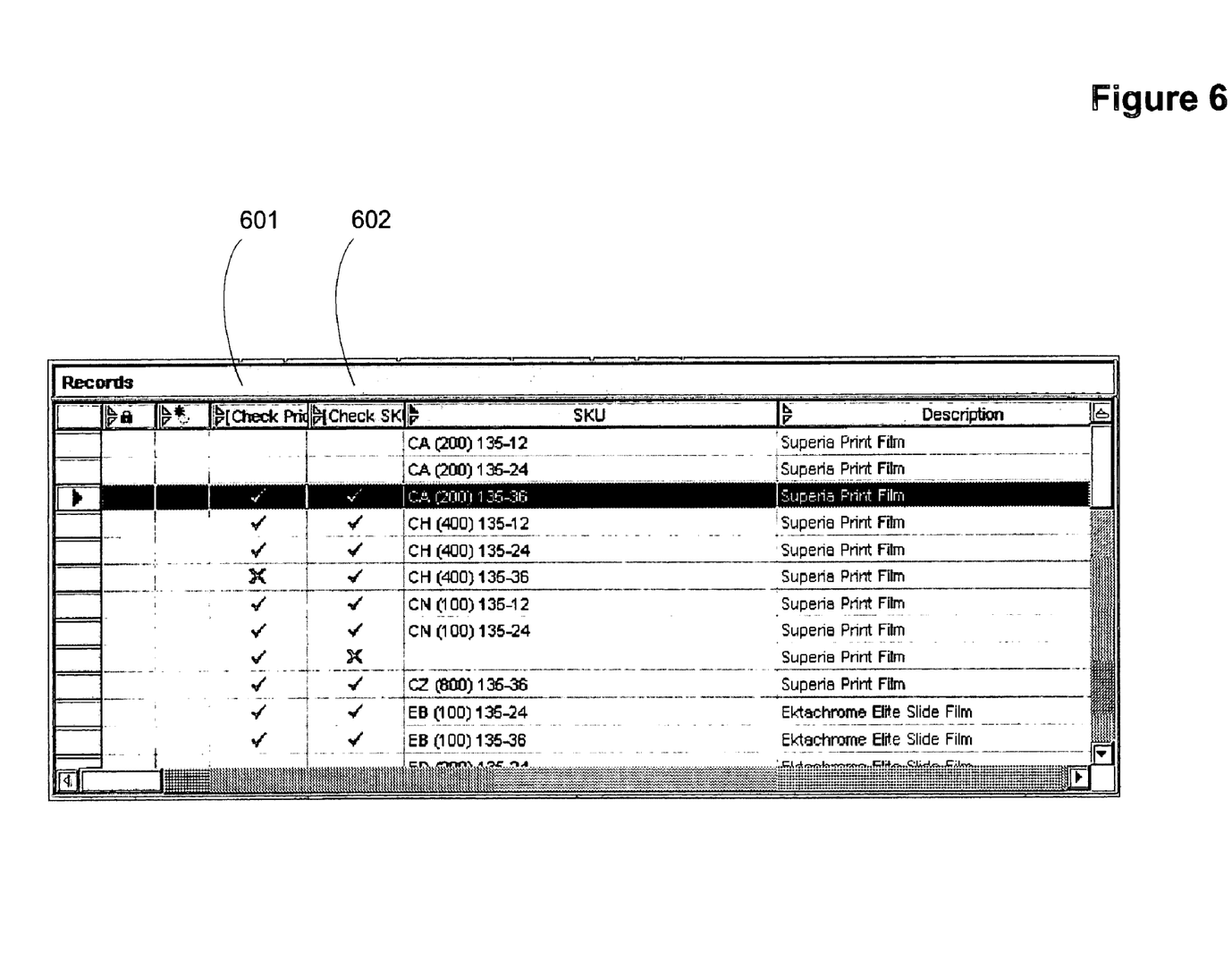
FIG. 6 illustrates an embodiment of the record details user interface comprising columns representing validation results.
Figure 7:
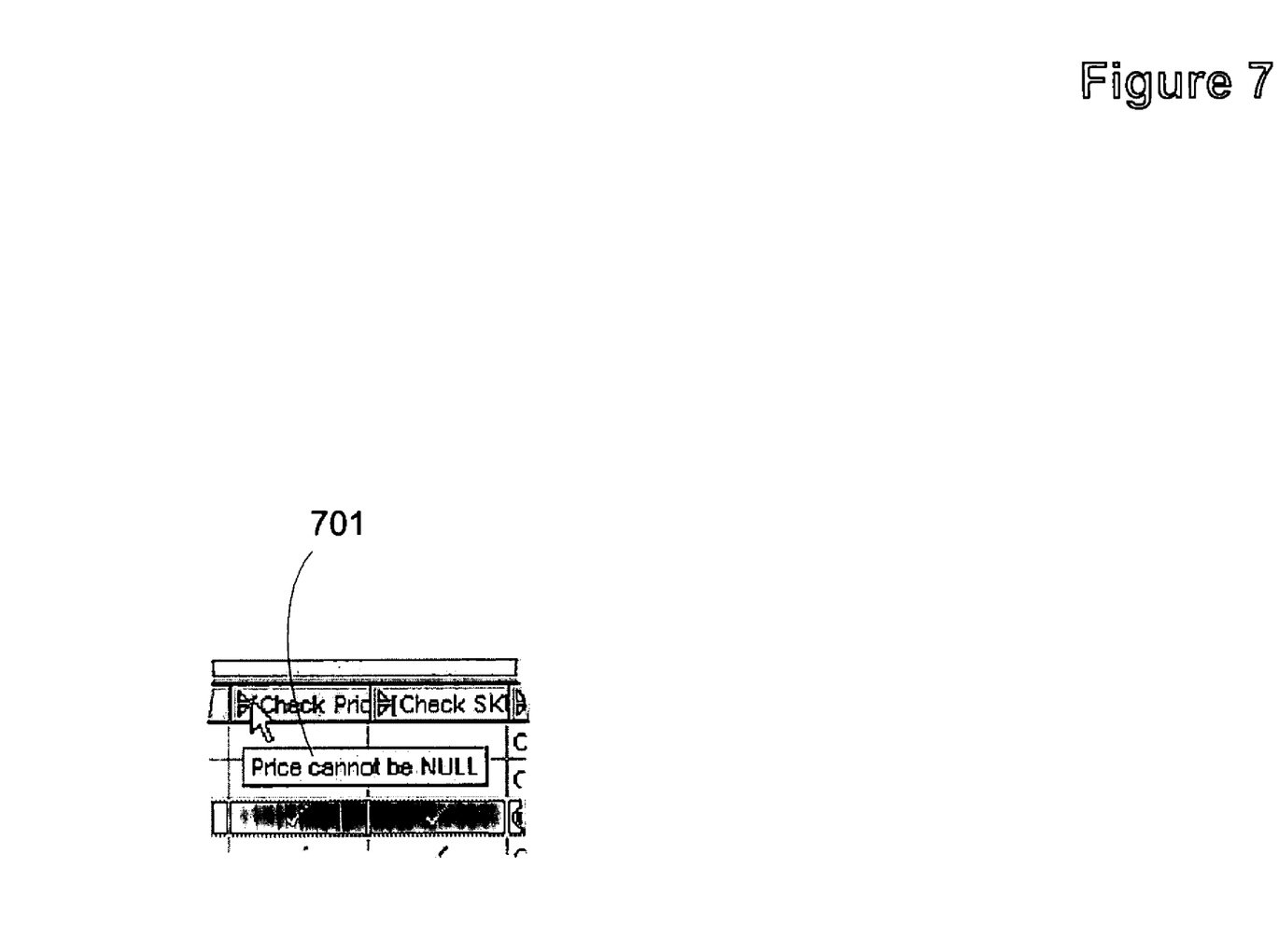
FIG. 7 illustrates a portion of an embodiment of the record details user interface comprising a tooltip showing a warning message associated with the validation result associated with the column.

FIG. 4 illustrates an embodiment of the validation expression user interface implemented as a warning dialog listing that is displayed for each validation that fails against any of the selected records. If the level of execution is set to error level, then an error dialog listing is displayed for a validation that fails against any of the records, an embodiment of which is shown as the validation error user interface in FIG. 5. In addition, a column may be added to the display of records for each validation indicating success or failure for that validation for each and every record, as shown in FIG. 6. Each validation result column may be named with the validation name in square brackets ([ ]) to denote that the column is not actually a field in the record. Naming the columns in this manner is not a requirement but simply signifies that the column is not a field in the database. Each validation result Boolean (TRUE or FALSE) value may be shown as check marks for TRUE or X's for FALSE results in the column, any other method of showing TRUE and FALSE values is in keeping with the spirit of the invention. When the mouse pointer is moved over the column title, a tooltip may be displayed showing the error message associated with the validation, as shown in FIG. 7. Any other method of showing the error associated with a validation column is in keeping with the spirit of the invention. Each validation result column may be sorted to group records that failed or succeeded with respect to the validation. Each record may then be edited to correct observed error(s). Sorting the columns may be performed by clicking on the column header. Clicking a second time on the column header switches the order of the records from ascending to descending with respect to the value in the field. See FIG. 7, by clicking at the location of the pointer the validation column is sorted with correctly validating rows separated from records that fail validation. Clicking again in the column header switches the uppermost records (for example the correctly validating records) with the lowermost records (for example the records failing validation).

A validation expression may be used in order to perform a search, either alone or in combination with an existing set of criteria. Since a record matching a search either matches or does not match a search, the value of searching for a given value or combination of values is a Boolean. Therefore, since validations of embodiments of the present invention return Boolean values, i.e., TRUE and FALSE, the validation expressions described herein may be used as searches. In this manner, the creation of expressions for searching for particular records does not have to be duplicated within a separate search facility since the records that successfully match a validation or fail a validation are defined by the validation expression itself. A drill down search for example may make use of a validation for further drilling down into a database.

For example, by dragging and dropping a validation listed in rows of validations 102 to the search parameters pane in the leftmost tree view in FIG. 1, further drill down into the records shown in the upper right portion of FIG. 1 is achieved. By performing a SHIFT-drag and drop of the validation listed in rows of validations 102 into the search parameters pane in the leftmost tree view in FIG. 1, the validations that fail are drilled down into. Another embodiment of the invention makes the default drag and drop action correspond to drilling down into records that fail validation and conversely SHIFT-drag and drop allows for records that correctly validate to be drilled down. Any other method of instantiating validations to further limit a search are in keeping with the spirit of the invention including use of another vertical tab named "Validation", i.e., in addition to the "Category", "Manufacturer" and "Free-Form Search" vertical tabs on the left side of FIG. 1 from which to select validations to use for searching. A Validation vertical tab may comprise a list of validations or a list or tree of the validations within validation groups that can be click on to provide further limiting of the category or manufacturer or free-form searches. The Category vertical pane shown in FIG. 1 with the tree view is a hierarchical split of the main data table for example a product table into a taxonomy of products. By clicking in the tree, all of the records that belong to that portion of the taxonomy are displayed in the upper right portion of FIG. 1, the record list. The Manufacturer vertical tab, when asserted, displays a manufacturer pane that lists all of the manufactures in the main data table, i.e., the manufacturers of the products that are listed in the main data table. Combining these is one method of creating a hierarchical family taxonomy that builds on the existing category hierarchy in the main data table.

Figure 8:
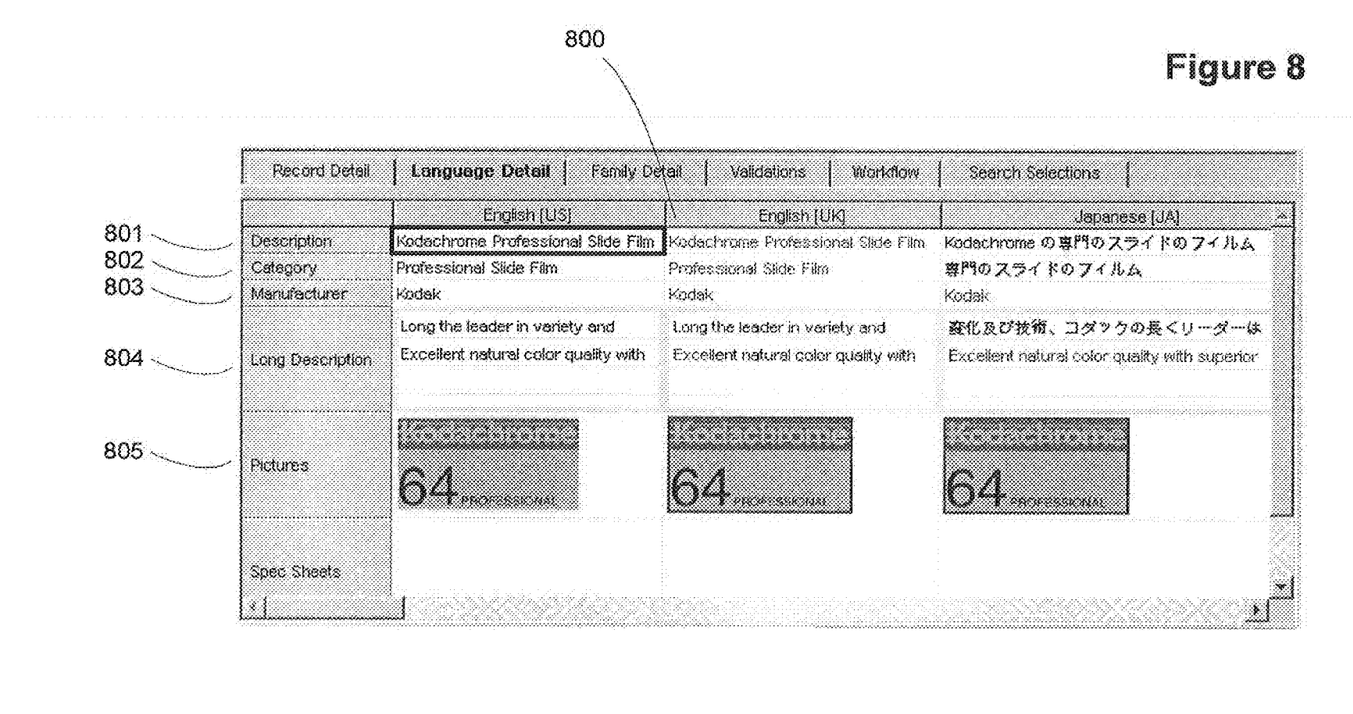
FIG. 8 illustrates an embodiment of the audience user interface pane.

Attributes are quantities that are associated with subsets of the main data table, i.e., specific to a given category. Fields are associated with all records of the main data table, i.e., all records in the main data table comprise the same fields, however, based on the category or other any other fields of the main data table, attributes may be associated with a subset of the records of the main data table. An audience may be thought of as a third dimension added on top of the main data table and attribute tables so that audiences that comprise different languages, regions, regulatory zones, or any other subdivision based on any quantity may be used to form a hierarchy upon which to find data for fields or attributes that are not found on a given audience level in the database. In other words, a hierarchy may be formed from the viewpoint of a given audience to take advantage of the entries of most of the other fields of another audience, so that multiple audiences that are similar may be readily supported. For example, to support a catalog targeting the United Kingdom, the word "colour" in a field or attribute would simply need to have the word "color" replaced in order to support the same catalog targeted at the United States. By making one audience inherit from another, any entries not found in one audience are automatically obtained from another audience. This increases the integrity of the data and allows for one edit to alter the output for as many audiences as use a piece of data. FIG. 8 illustrates an embodiment of the audience user interface an embodiment of which has been simplified to be language and country specific. Audience pane 800, comprises a horizontal set of columns that represent the supported audiences and with a vertical axis display each field for selected records comprising fields named description 801, category 802, manufacturer 803, long description 804 and pictures 805. For each field, any value that is not found in the leftmost column, e.g., "English [US]", is taken from the next column to the right. In addition, the record interface may display each of the primary level of inheritance fields in black and the inherited fields in other colors or bold to show that they are inherited and are not found with respect to the audience through which the user has chosen to view the data with. Other methods of forming a hierarchy of audiences that is not table specific are in keeping with the spirit of the invention, such as forming a hierarchy of audiences in a table or tree.

Figure 9:
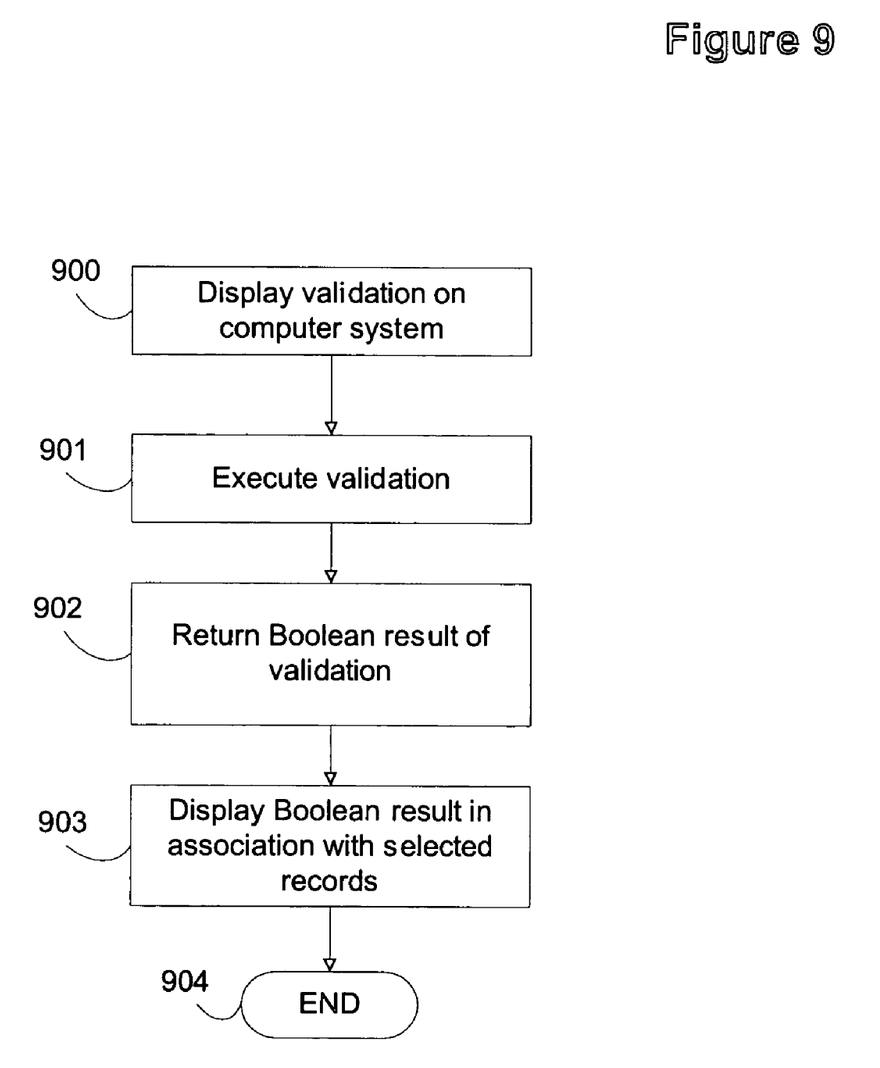
FIG. 9 illustrates a flowchart detailing a method for performing expression based validation.

FIG. 9 illustrates a flowchart detailing a method for performing expression based validation. A validation is displayed at 900, the properties of the validation may be viewed and edited at this time, or the validation may be displayed to a software module programmatically. The validation expression is executed via parsing and running the expression or by running a previously parsed and compiled expression at 901. Any other method of executing a tokenized expression is in keeping with the spirit of the invention. The result of the validation is a Boolean quantity that is returned at 902. The Boolean value is displayed in association with each record that was selected for validation. Optionally, this display is shown as a column that would normally be used for a field of a table with a title label for the column set to the name of the validation.

Figure 10:
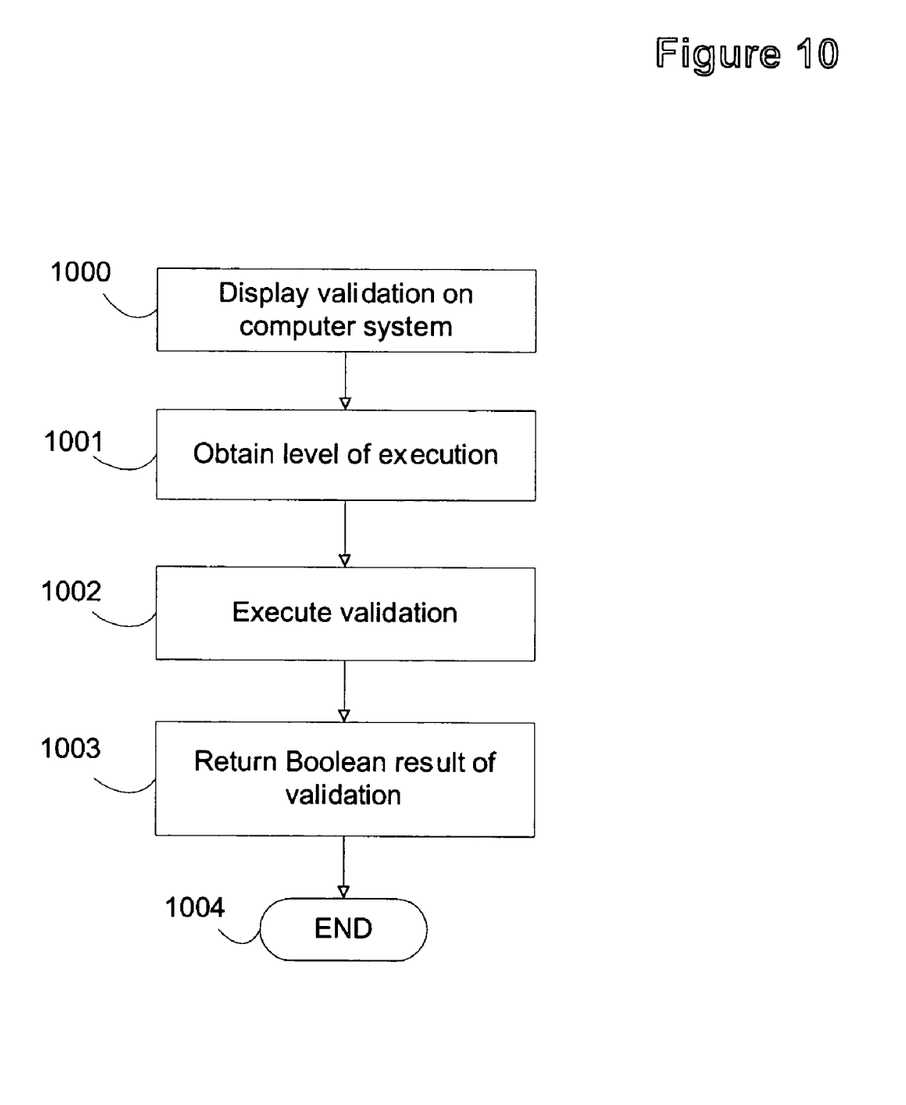
FIG. 10 illustrates a flowchart detailing another embodiment of a method for performing expression based validation.

FIG. 10 illustrates a flowchart detailing a method for performing expression based validation. A validation is displayed at 1000. The level of execution is obtained at 1001. This may comprise warning level or error level or any other level of granularity desired such as "none" which may be implemented as disabling the validation. The validation expression is executed via parsing and running the expression or by running a previously parsed and compiled expression at 1002. Any other method of executing a tokenized expression is in keeping with the spirit of the invention. The result of the validation is a Boolean quantity that is returned at 1003.

Figure 11:
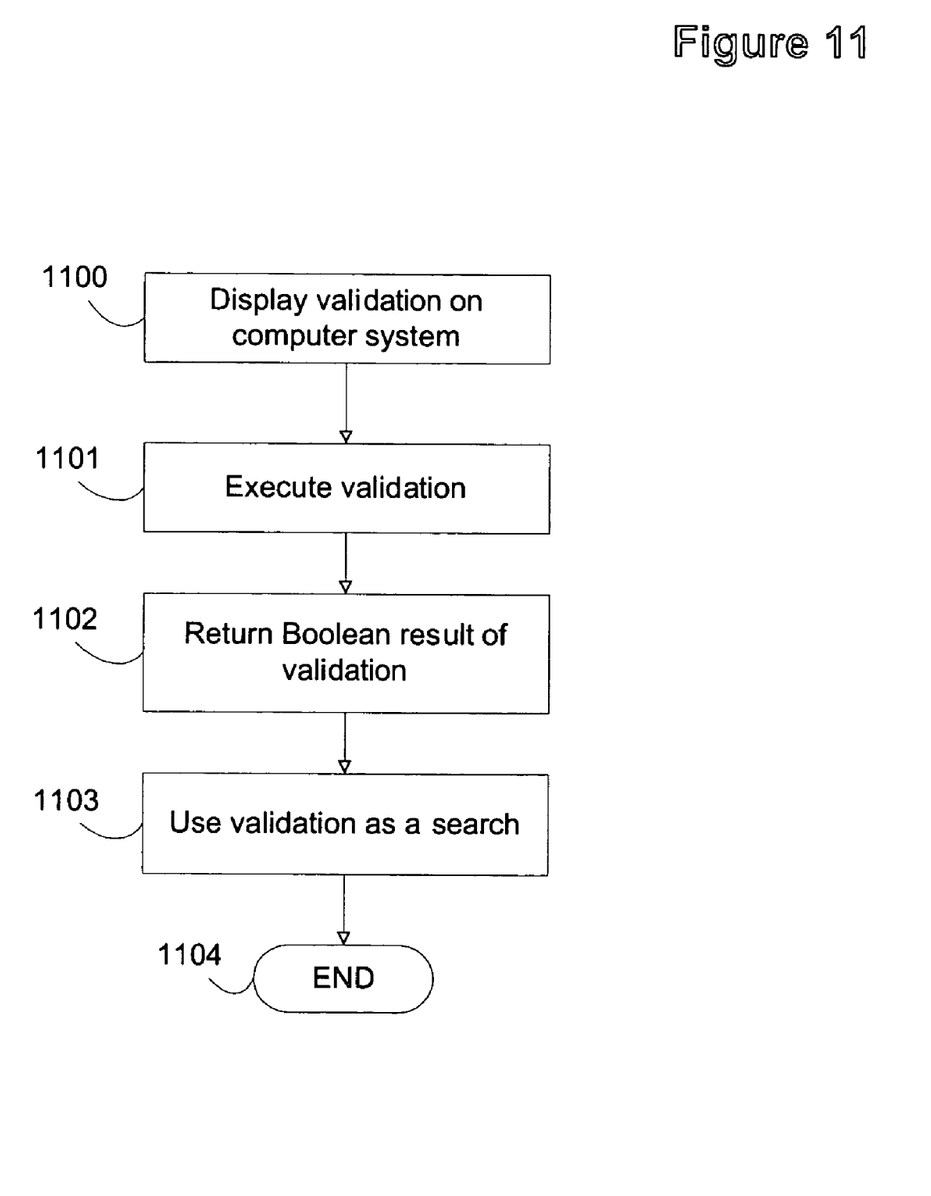
FIG. 11 illustrates a flowchart detailing another embodiment of a method for performing expression based validation.

FIG. 11 illustrates a flowchart detailing a method for performing expression based validation. A validation is displayed at 1100. The validation expression is executed via parsing and running the expression or by running a previously parsed and compiled expression at 1101. Any other method of executing a tokenized expression is in keeping with the spirit of the invention. The result of the validation is a Boolean quantity that is returned at 1102. The validation is used as a search or part of a search in the case for example of a drill-down search utilizing other search agents at 1103.

U.S. Pat. No. 6,754,666 entitled "Efficient Storage And Access In A Database Management System" filed Aug. 21, 2000, U.S. patent application Ser. No. 09/643,207 entitled "Data Editing And Verification User Interface" filed Aug. 21, 2000, U.S. patent application Ser. No. 09/960,902 entitled "Method And Apparatus For Structuring, Maintaining, And Using Families Of Data" filed Sep. 20, 2001, U.S. patent application Ser. No. 11/142,809, entitled "Multi-Layered Data Model for Generating Audience Specific Documents" filed May 31, 2005, U.S. patent application Ser. No. 11/141,984 entitled "Interface for Indicating the Presence of Inherited Values in a Document" filed May 31, 2005 are all hereby incorporated herein by reference and used in combination with the embodiments of the invention enabled herein.

While the invention herein disclosed has been described by means of specific embodiments and applications thereof, numerous modifications and variations could be made thereto by those skilled in the art without departing from the scope of the invention set forth in the claims.

What is claimed is:

1. A method for performing expression-based validation of hierarchical audience data records operating on a computer coupled to a computer system database comprising:

generating a token-based menu for an expression-builder user interface for display on a display device informationally coupled to a computer system database, wherein said token-based menu comprises a drop-down list of at least one token and further wherein said token-based menu contributes said at least one token to a validation expression, and further wherein said validation expression references said at least one token, and further wherein said token-based menu further comprises a drop-down list of attributes;

displaying said drop-down list coupled to said expression-builder user interface;

using said user interface to build said validation expression for validating a plurality of hierarchical audience data records in said computer system database, wherein said validation expression further comprises said at least one token selected from said drop-down list of attributes of said token-based menu, wherein the hierarchical audience data records are stored in an audience hierarchy formed from the viewpoint of a given audience;

executing said validation expression to produce a Boolean result for each of said plurality of hierarchical audience data records;

where when any of said Boolean results comprises a failure, obtaining a level of execution for said validation expression wherein said level of execution comprises one of a plurality of levels; and, displaying said plurality of Boolean results.

2. The method of claim 1 further comprising:
using said validation expression as a search filter.

3. The method of claim 2 further comprising:
limiting a drill-down search using said validation expression in conjunction with a hierarchal search tool.

4. The method of claim 2 further comprising:
limiting a drill-down search using said validation expression in conjunction with a free form search tool.

5. The method of claim 1 further comprising:
wherein said plurality of levels comprises a warning, displaying a warning; and,
permitting updating of at least one record.

6. The method of claim 1 further comprising:
wherein said plurality of levels comprises an error, displaying an error; and,
denying the update of at least one record.

7. The method of claim 1 wherein said executing said validation expression comprises executing said validation expression as part of a workflow.

8. The method of claim 1 wherein said displaying further comprises displaying said plurality of Boolean results in a column associated with said plurality of hierarchical audience data records on said user interface.

9. The method of claim 1 wherein said executing said validation expression comprises setting a tooltip such that said tooltip shows a message associated with each said Boolean result.

10. The method of claim 1 further comprising:
grouping a plurality of validation expressions into a validation group; and,
said executing step further comprising executing all validation expressions in said validation group.

11. The method of claim 10 further comprising:
forming a hierarchy comprising said plurality of validation expressions.

12. A method for performing expression-based validation of fields and attributes operating on a computer coupled to a computer system database comprising:

generating a token-based menu for an expression-builder user interface display on a display device informationally coupled to a computer system database, wherein said token-based menu comprises a drop-down list of at least one token;

displaying said user interface of said computer system database comprising said token-based menu for creating a validation expression for validating hierarchical audience data in fields and attributes of said computer system database wherein said validation expression comprises a Boolean validation expression, wherein the hierarchical audience data is stored in an audience hierarchy formed from the viewpoint of a given audience;

obtaining an audience hierarchy having related parent audience data and child audience data;

inheriting a field from said parent audience data as an operand for said at least one token wherein said field is missing from said child audience data;

accepting said at least one token from said user interface and a value for said field to build said validation expression, wherein said field value is associated with a language, region and regulatory zone;

executing said validation expression on said field value to produce a Boolean result, wherein said executing further comprises setting a tooltip value for said Boolean result associated with at least one record on said user interface wherein said tooltip value comprises a message that is associated with said Boolean result;

returning said Boolean result; and, displaying said Boolean result in association with said field.

13. The method of claim 12 wherein said displaying further comprises displaying said Boolean result on said user interface in a column associated with at least one record associated with said field.

14. The method of claim 12 further comprising:
using said validation expression as a search filter.

15. The method of claim 14 further comprising:
limiting a drill-down search using said validation expression in conjunction with a hierarchal search tool.

16. The method of claim 14 further comprising:
limiting a drill-down search using said validation expression in conjunction with a free form search tool.

17. The method of claim 12 further comprising:
wherein said token-based menu comprises at least one drop-down list of attributes;
displaying said at least one drop-down list of attributes; and,
building said validation expression from user selections from said at least one drop-down list of said token-based menu.

18. The method of claim 12 further comprising:
obtaining a level of execution for said validation expression wherein said level of execution comprises a plurality of levels including warning level and error level.

19. The method of claim 18 further comprising:
displaying a warning when said executing said validation expression fails when said level of execution is said warning level; and,
updating at least one record of said computer system database.

20. A method for performing expression-based validation of hierarchical audience data field values operating on a computer coupled to a computer system database comprising:

generating a token-based menu for an expression-builder user interface for a computer system database, wherein said token-based menu comprises a drop-down list of at least one token;

displaying said user interface display on a display device informationally coupled to said computer system database comprising said token-based menu for creating a validation expression for validating data field values of hierarchical audience data stored in a computer system database, wherein the hierarchical audience data is stored in an audience hierarchy formed from the viewpoint of a given audience;

obtaining at least one data field value of said hierarchical audience data, wherein said at least one data field value is associated with a language, region and regulatory zone, and further wherein said at least one data field value excluded from a child audience is inherited from a parent audience that comprises said at least one data field value;

associating said at least one data field value with said at least one token of said token-based menu;

accepting the selection of said at least one token to build said validation expression executing said validation expression to produce a Boolean result;

returning said Boolean result; and, using said validation expression as a search filter.

* * * * *